US006333910B1

(12) United States Patent
Nishikawa et al.

(10) Patent No.: US 6,333,910 B1
(45) Date of Patent: Dec. 25, 2001

(54) OPTICAL SYSTEM FOR OPTICAL DISC DRIVE

(75) Inventors: Hiroshi Nishikawa, Saitama-ken; Suguru Takishima, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/181,553

(22) Filed: Oct. 29, 1998

(30) Foreign Application Priority Data

Oct. 31, 1997 (JP) ...................................... 9-316083
Oct. 31, 1997 (JP) ...................................... 9-316084

(51) Int. Cl.$^7$ ...................................... G11B 7/00

(52) U.S. Cl. ......................................... 369/119; 369/44.19

(58) Field of Search ..................................... 369/118, 119, 369/44.23, 44.24, 44.28, 300, 44.14, 44.19, 112.01, 112.29

(56) References Cited

U.S. PATENT DOCUMENTS

| | | |
|---|---|---|
| 2,750,461 | 6/1956 | Bunch . |
| 3,244,917 | 4/1966 | Gute . |
| 3,354,833 | 11/1967 | Laing . |
| 4,088,914 | 5/1978 | Aoki . |
| 4,126,796 | 11/1978 | Ito . |

(List continued on next page.)

FOREIGN PATENT DOCUMENTS

| | | |
|---|---|---|
| 0084727 | 8/1983 | (EP) . |
| 0084728 | 8/1983 | (EP) . |
| 0448362 | 9/1991 | (EP) . |
| 0790512 | 8/1997 | (EP) . |

(List continued on next page.)

OTHER PUBLICATIONS

An article entitled "Trillions Of Bytes", by Eric Nee, which appeared in the Mar. 24, 1997 issue of Forbes magazine.
A screen capture of a page from TeraStor's website (dated Mar. 19, 1997) entitled "Architecture of TeraStor's Near–Field Technology".
An article entitled "In 1998, 10 GB Per Inch$^2$ Is Realized Using New Optical Recording Technology", appeared at pp. 148–151 of the Sep. 1997 Japanese language edition of Nikkel Byte magazine.
Patent Abstracts of Japan, vol. 012, No. 140 (P–696), dated Apr. 18, 1988.
Patent Abstracts of Japan, vol. 017, No. 505 (P–1611), dated Sep. 10, 1993.
An article entitled "Optical Magnetic Disk Device Of U.S. TeraStor Succeeds Tracking Control—Track Pitch Of 0.34 μm Realized Using Two–Stage Servo", which appeared at pp. 13 and 14 of the Japanese language magazine *Nikkei Electronics*Sep. 22, 1997 (No. 699).
Patent abstract of JP 62–262017.
Patent abstract of JP 5–128561.
B. D. Terris et al., "Near–Field Optical Data Storage", Applied Physics Letters, vol. 68, p. 141–143, Jan. 8, 1996.

*Primary Examiner*—Nabil Hindi
(74) *Attorney, Agent, or Firm*—Greenblum & Bernstein, P.L.C.

(57) ABSTRACT

Disclosed is an optical system for an optical disc drive. The head is provided with a laser source, an objective optical system, and a deflection mirror provided between the laser source and the objective optical system. As the deflection mirror is rotated, the angle of incidence of the beam incident of the objective optical system changes so that a fine tracking is performed. When the deflection mirror is rotated, based on the rotation amount and a distance between the deflection mirror and the objective optical system, the deflection mirror is moved in a direction along which the laser beam is incident so that the laser beam deflected by the deflection mirror is incident on the objective optical system substantially at the same position regardless of rotation amount of the deflection mirror.

9 Claims, 9 Drawing Sheets

U.S. PATENT DOCUMENTS

| | | |
|---|---|---|
| 4,206,379 | 6/1980 | Owda . |
| 4,285,566 | 8/1981 | Yamamoto . |
| 4,297,713 | 10/1981 | Ichikawa et al. . |
| 4,351,596 | 9/1982 | Ohniwa et al. . |
| 4,466,088 | 8/1984 | Trethewey . |
| 4,744,071 * | 5/1988 | Bricot et al. ............ 369/44.24 |
| 4,891,998 | 1/1990 | Tourville . |
| 4,959,824 * | 9/1990 | Ueda et al. ............ 369/44.14 |
| 4,968,876 | 11/1990 | Iima . |
| 5,125,750 | 6/1992 | Corle et al. . |
| 5,126,899 | 6/1992 | Kanazawa . |
| 5,136,559 | 8/1992 | Nakayama . |
| 5,151,890 | 9/1992 | Yonekubo . |
| 5,220,550 | 6/1993 | Nakayama . |
| 5,253,245 * | 10/1993 | Rabedeau ............ 369/119 |
| 5,254,893 | 10/1993 | Ide . |
| 5,289,444 * | 2/1994 | Tanaka ............ 369/44.14 |
| 5,365,504 | 11/1994 | Noguchi . |
| 5,383,174 * | 1/1995 | Numata et al. ............ 369/119 |
| 5,420,848 * | 5/1995 | Date et al. ............ 369/112 |
| 5,422,872 * | 6/1995 | Hsu et al. ............ 369/119 |
| 5,444,683 * | 8/1995 | Ishikawa et al. ............ 369/44.28 |
| 5,461,498 | 10/1995 | Iwao . |
| 5,517,474 * | 5/1996 | Takamine ............ 369/44.32 |
| 5,532,480 | 7/1996 | Scofield . |
| 5,564,585 | 10/1996 | Saitoh . |
| 5,596,446 | 1/1997 | Plesko . |
| 5,608,280 | 3/1997 | Tamemoto et al. . |
| 5,610,752 | 3/1997 | Hayakawa . |
| 5,625,244 | 4/1997 | Bradfield . |
| 5,684,762 | 11/1997 | Kubo . |
| 5,705,868 | 1/1998 | Cox et al. . |
| 5,719,834 | 2/1998 | Futagawa et al. . |
| 5,764,613 | 6/1998 | Yamamoto . |
| 5,768,241 | 6/1998 | Kanazawa et al. . |
| 5,844,676 | 12/1998 | Southam et al. . |
| 5,886,438 | 3/1999 | Kawanishi . |
| 5,920,140 | 7/1999 | Nakagishi et al. . |
| 6,055,221 * | 3/1999 | Ikegame ............ 369/119 |

FOREIGN PATENT DOCUMENTS

| | | |
|---|---|---|
| 0907163 | 4/1999 | (EP) . |
| 907163 | 4/1999 | (EP) . |
| 378922 | 8/1932 | (GB) . |
| 1314002 | 4/1973 | (GB) . |
| 1457995 | 12/1976 | (GB) . |
| 2000604 | 1/1979 | (GB) . |
| 2086092 | 5/1982 | (GB) . |
| 2193341 | 2/1988 | (GB) . |
| 62-262017 | 11/1987 | (JP) . |
| 64-2015 | 1/1989 | (JP) . |
| 5-128561 | 5/1993 | (JP) . |
| 5128561 | 5/1993 | (JP) . |
| 8315404 | 11/1996 | (JP) . |
| 90/08363 | 7/1990 | (WO) . |
| 98/06095 | 2/1998 | (WO) . |
| 98/49675 | 11/1998 | (WO) . |
| 98/49684 | 11/1998 | (WO) . |

* cited by examiner

OPTICAL SYSTEM FOR OPTICAL DISC DRIVE

BACKGROUND OF THE INVENTION

The present invention relates to an optical system to be employed in an optical disc drive to read/write data from/to an optical disc.

Recently, technology in the field of magneto-optical disc drives has been greatly improved such that a data recording density on a magneto-optical disc has reached in excess of 10 Gbits/inch$^2$.

In such an optical disc drive, an objective optical system is mounted on an arm which is movable in a transverse direction of tracks formed on an optical disc for rough tracking. Firstly, the rough tracking is performed to locate the optical head in the vicinity of the track. Then, an incident angle of a beam incident on the objective optical system is changed to locate a spot of beam formed by the objective optical system for fine tracking, with use of a galvano mirror or the like. During the fine tracking operation, the beam spot is accurately located on one of the tracks whose pitch is, for example, 0.34 μm. When the beam spot is moved on the disc surface, i.e., when the incident angle of the beam incident on the objective optical system is being changed, it is preferable that an intensity distribution of the beam does not vary on the disc surface. In other words, it is preferable that, in such an optical system, a coupling efficiency of a light beam traveling between the objective optical system and a light source applicable to the optical disc drive is relatively high.

SUMMARY OF THE INVENTION

It is therefore an object of the invention to provide an improved optical system, which is applicable to an optical disc drive having a rotatable deflection system, and has a relatively high coupling efficiency between a light source and an objective optical system.

According to an aspect of the invention, there is provided an optical system for an optical disc drive, which is provided with: a laser source that emits a laser beam; an objective lens that receives the laser beam and converges the laser beam on an optical disc; a deflection mirror provided between the laser source and the objective lens, the deflection mirror being rotatable about a rotation axis, the laser beam emitted by the laser source being reflected by the deflection mirror and directed toward the objective lens, the laser beam proceeding from the deflection mirror toward the objective lens proceeding in a direction parallel to an optical axis of the optical system when the deflection mirror is located at a neutral position; a first driver which rotates the deflection mirror; a rotation amount detecting system that detects a rotation angle of the deflection mirror with respect to the neutral position; and a second driver which moves the deflection mirror in a direction along which the laser beam is incident, from the laser source, onto the deflection mirror, the second driver moving the deflection mirror. With this construction, it becomes possible that the laser beam deflected by the deflection mirror is incident on the objective optical system substantially at the same position regardless of rotation amount of the deflection mirror.

In particular, the second driver moves the deflection mirror in accordance with the rotation angle of the deflection mirror.

Specifically, an amount (h) of movement of the deflection mirror is determined based on an equation below:

$$h = L \tan(2\theta),$$

wherein, L represents a distance between the deflection mirror and the objective optical system, and θ represents the rotation angle of the deflection mirror.

In one case, the objective optical system is movable in a transverse direction of tracks formed on the optical disc, and the distance between the laser source and the objective optical system may be changeable. Alternatively, the distance between the laser source and the objective optical system may be constant.

Optionally, the rotation axis of the deflection mirror extends perpendicular to a surface of the optical disc, and the second driver moves the deflection mirror in a direction parallel to the surface of the optical disc. Alternatively, the rotation axis of the deflection mirror extends in parallel with a surface of the optical disc, and wherein the second driver moves the deflection mirror in a direction perpendicular to the surface of the optical disc. Further alternatively, the rotation axis of the deflection mirror extends in parallel with a surface of the optical disc, and the second driver moves the deflection mirror in a direction parallel to the surface of the optical disc.

According to another aspect of the invention, there is provided a method of deflecting, by means of a deflection mirror, a light beam emitted by a light source towards an objective optical system of an optical head for an optical disc drive, which includes the steps of rotating the deflection mirror, and moving the deflection mirror in a direction along which the light beam emitted by the light source is incident on the deflection mirror such that the laser beam deflected by the deflection mirror is incident on the objective optical system substantially at the same position regardless of rotation amount of the deflection mirror.

Specifically, an amount (h) of movement of the deflection mirror is determined based on an equation below:

$$h = L \tan(2\theta),$$

wherein, L represents a distance between the deflection mirror and the objective optical system, and θ represents the rotation angle of the deflection mirror. In a particular case, the objective optical system is movable in a transverse direction of tracks formed on the optical disc, and the distance between the light source and the objective optical system may be changeable. Alternatively, the distance between the light source and the objective optical system may be constant.

DESCRIPTION OF THE EMBODIMENTS

Hereinafter, the invention will be described with reference to the accompanying drawings.

Firstly, an optical disc drive, to which an optical system according to a first embodiment is employed, will be described.

Figure 1:
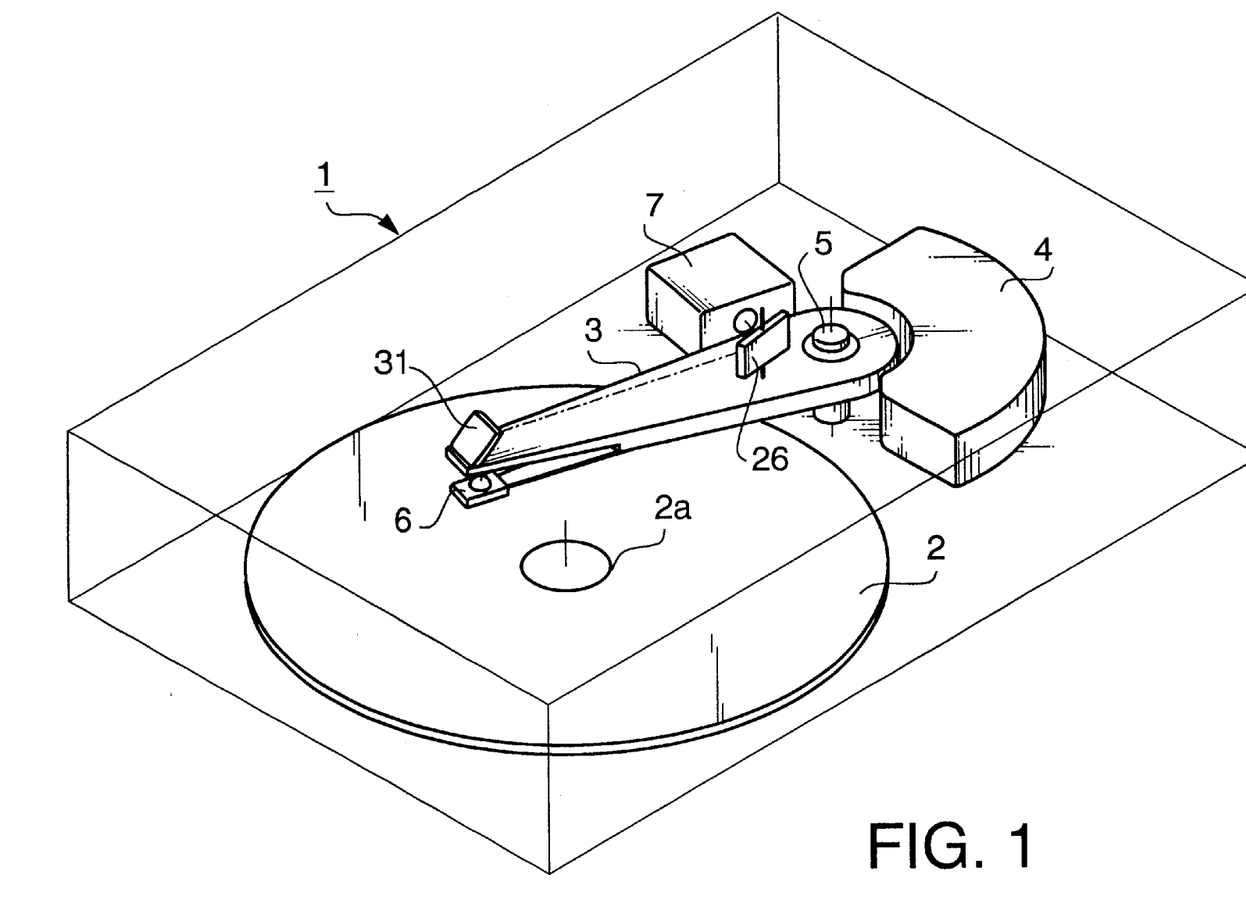
FIG. 1 is a perspective view of an optical disc drive according to a first embodiment of the present invention.

FIG. 1 is a perspective view of the optical disc drive (hereinafter, referred to as the disc drive) 1. The disc drive 1 is arranged to write and read data on an optical disc 2 by means of a so-called Near Field Recording (NFR) technology.

In the disc drive 1, the optical disc 2 is mounted to a rotating shaft 2a of a not-shown spindle motor. The disc drive 1 includes a rotary arm 3 extending in parallel to a surface of the optical disc 2, and is rotatably supported by a shaft 5. A floating head 6 that carries optical elements (described later) is provided to a tip of the rotary arm 3. When the rotary arm 3 is rotated, the floating head 6 moves across tracks formed on the optical disc 2. The rotary arm 3 is further provided with a light source module 7 in the vicinity of the shaft 5.

Figure 2:
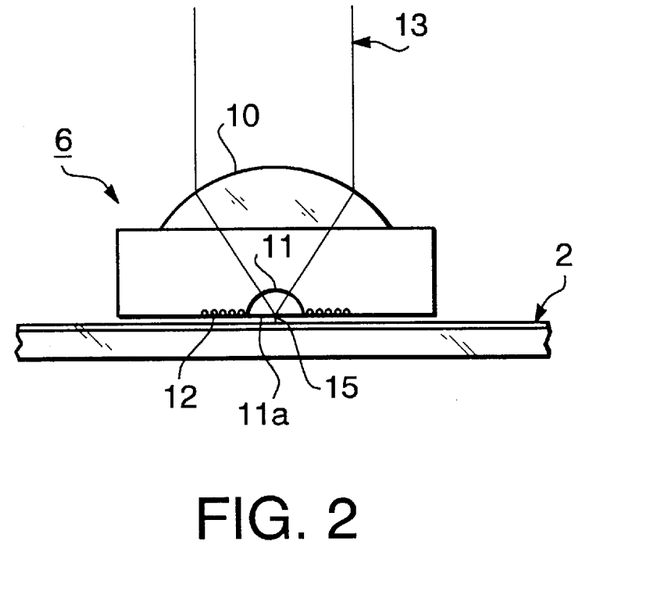
FIG. 2 is an enlarged view of a floating head of the optical disc drive of FIG. 1.
Figure 3:
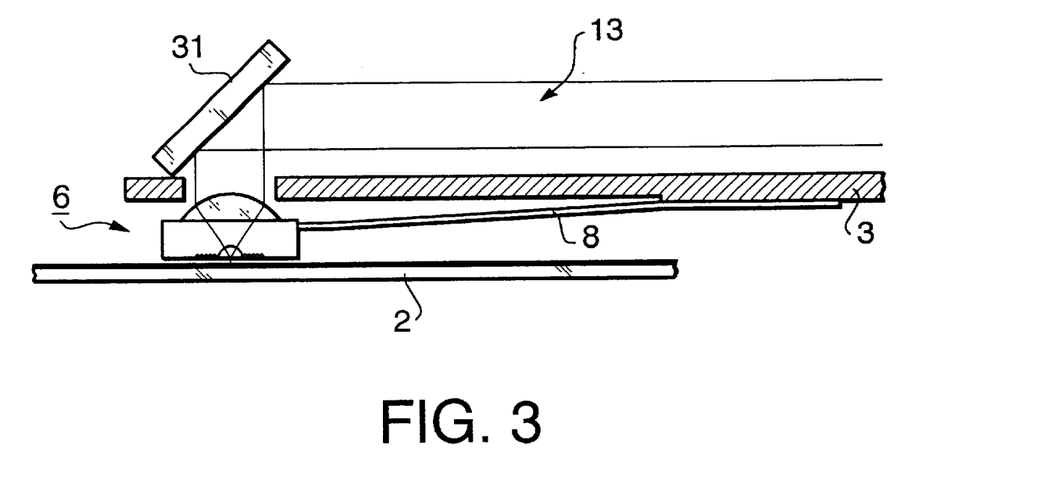
FIG. 3 is an enlarged view of the tip of the rotary arm of the optical disc drive of FIG. 1.

FIG. 2 is an enlarged view of the floating head 6. FIG. 3 is an enlarged view of the tip of the rotary arm 3. As shown in FIG. 3, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disc 2 rotates, the floating head 6 is lifted upward by air flow generated between the spinning optical disc 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIG. 2, the floating head 6 includes an objective lens 10 and a solid immersion lens (SIL) 11. A reflection mirror 31 is provided to the rotary arm 3, which reflects the laser beam 13 emitted from the light source module 7 (FIG. 4) to the objective lens 10. The objective lens 10 converges the laser beam 13. The solid immersion lens 11 is a hemispherical lens and the plane surface thereof is faced with the optical disc 2. Further, the focal point of the objective lens 10 is positioned on the plane surface of the solid immersion lens 11. That is, the laser beam 13 is converged on the plane surface 11a of the solid immersion lens 11. Since the clearance of the optical disc and the plane surface 11a of the solid immersion lens 11 is less than 1 μm, the converged laser beam is converted to a so-called evanescent beam and reaches the optical disc 2. Since the beam diameter of the evanescent beam is smaller than the converged laser beam, a data storage capacity can be remarkably increased. Application of the solid immersion lens and the evanescent beam in a data recording device is disclosed in B. D. Terris, H. J. Manin, and D. Rugar, "Near-field optical data storage", Appl. Phys. Lett. 68, 141–143 (1996), and U.S. Pat. No. 5,125,750 issued on Jun. 30, 1992, teachings of which are incorporated by reference in their entireties.

In order to apply magnetic field on the surface of the optical disc 2, a coil 12 is provided around the solid immersion lens 11. A current flow in the coil 12 generates a magnetic field in which the optical disc 2 is positioned. Data writing is performed by the evanescent beam from the solid immersion lens 11 and the magnetic field generated by the coil 12.

Figure 4:
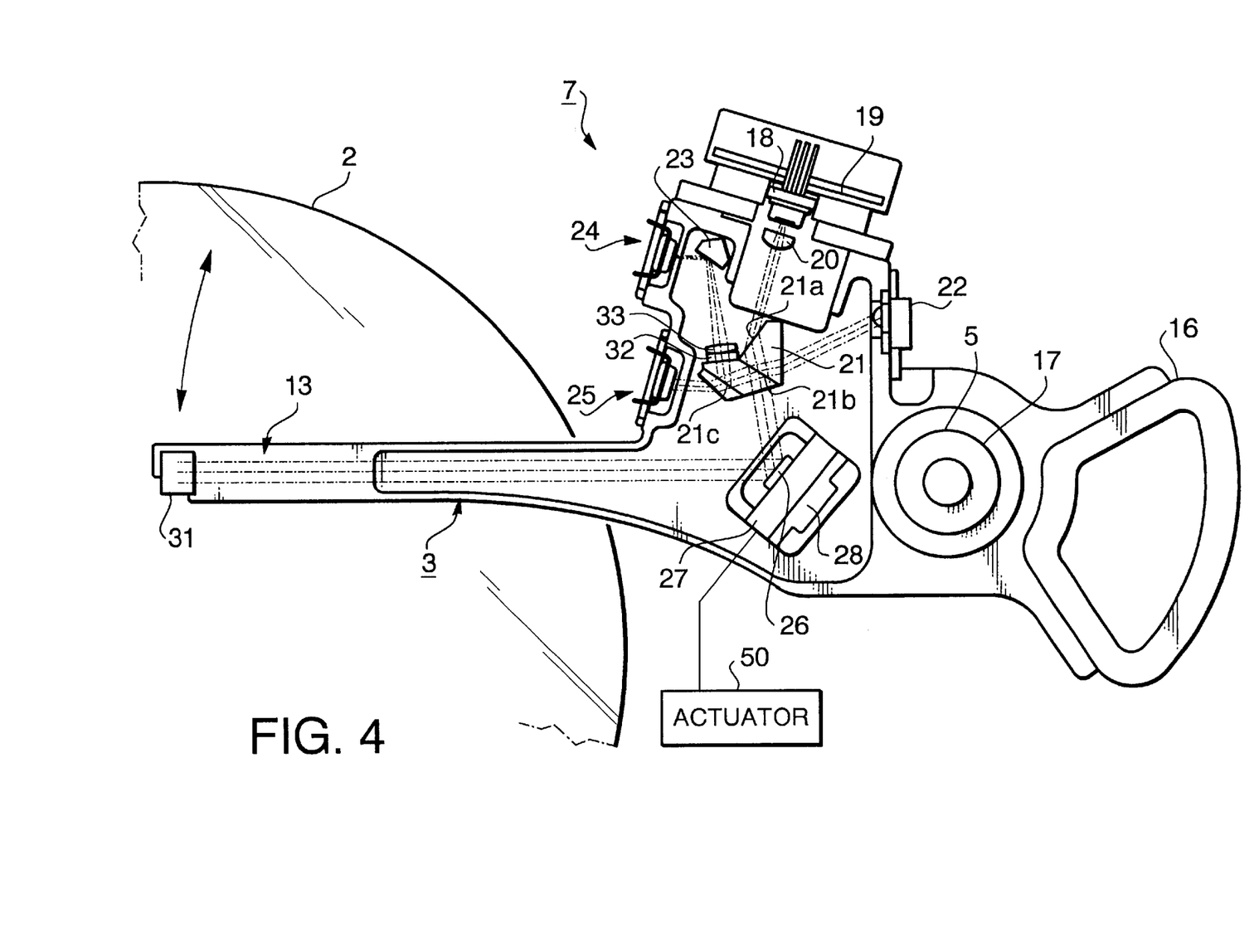
FIG. 4 is a top view of the rotary arm of the optical disc drive of FIG. 1.
Figure 5:
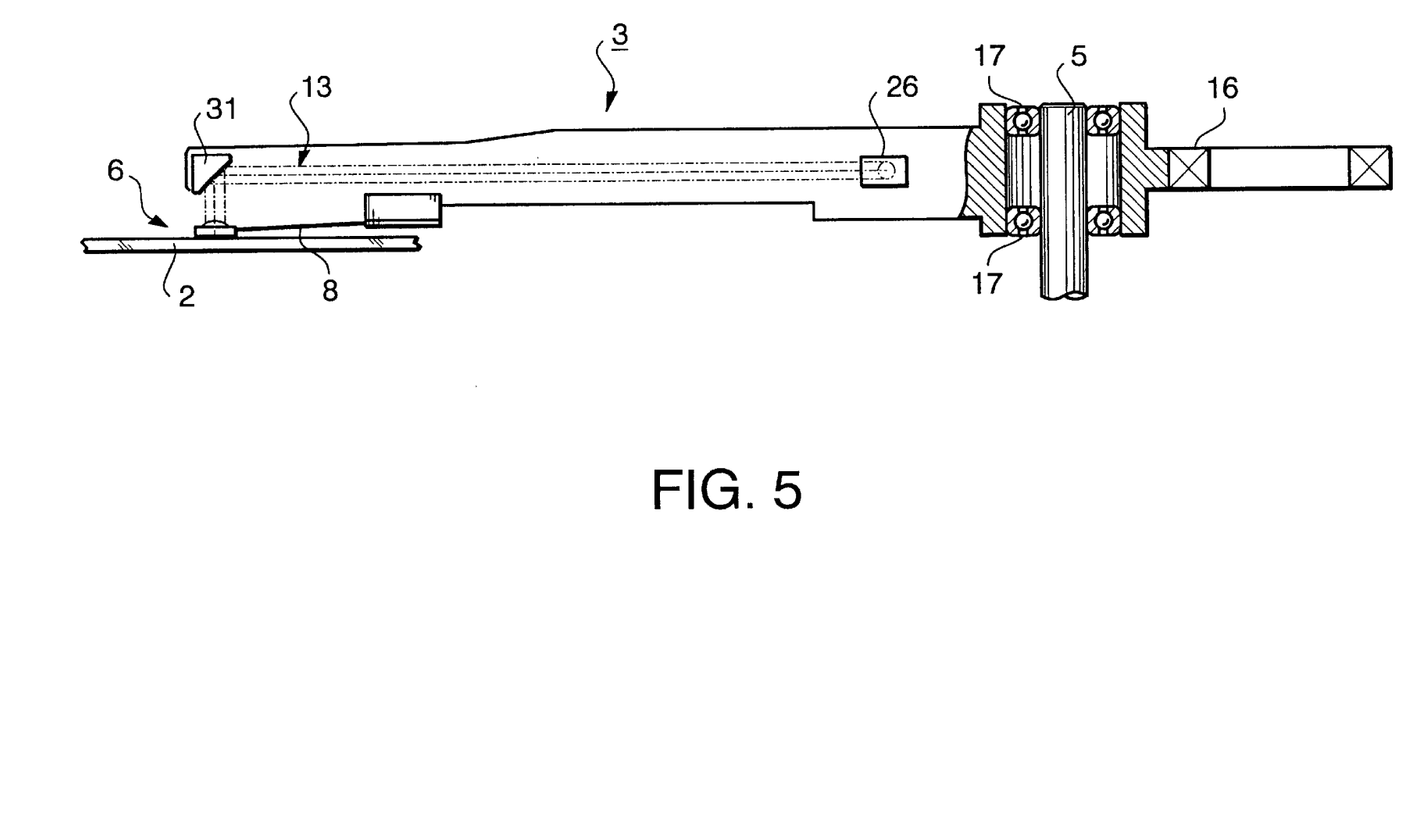
FIG. 5 is a longitudinal sectional view of the rotary arm of the optical disc drive of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disc 2. For this purpose, a galvano mirror 26 is provided in a light path between the light source module 7 and the objective lens 10. In particular, the galvano mirror 26 is located so that the laser beam 13 emitted from the light source module 7 directly enters therein. The laser beam 13 reflected by the galvano mirror 26 proceeds to the reflection mirror 31 and is reflected (by the reflection mirror 31) to the floating head 6. Then, the laser beam 13 is converged and incident on the optical disc 2. By rotating the galvano mirror 26, the incident angle of the laser beam 13 incident on the objective lens 10 is changed, so that the light spot on the optical disc 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the objective lens 10, there is a possibility that the laser beam 13 partially fails to enter the objective lens 10.

Figure 6:
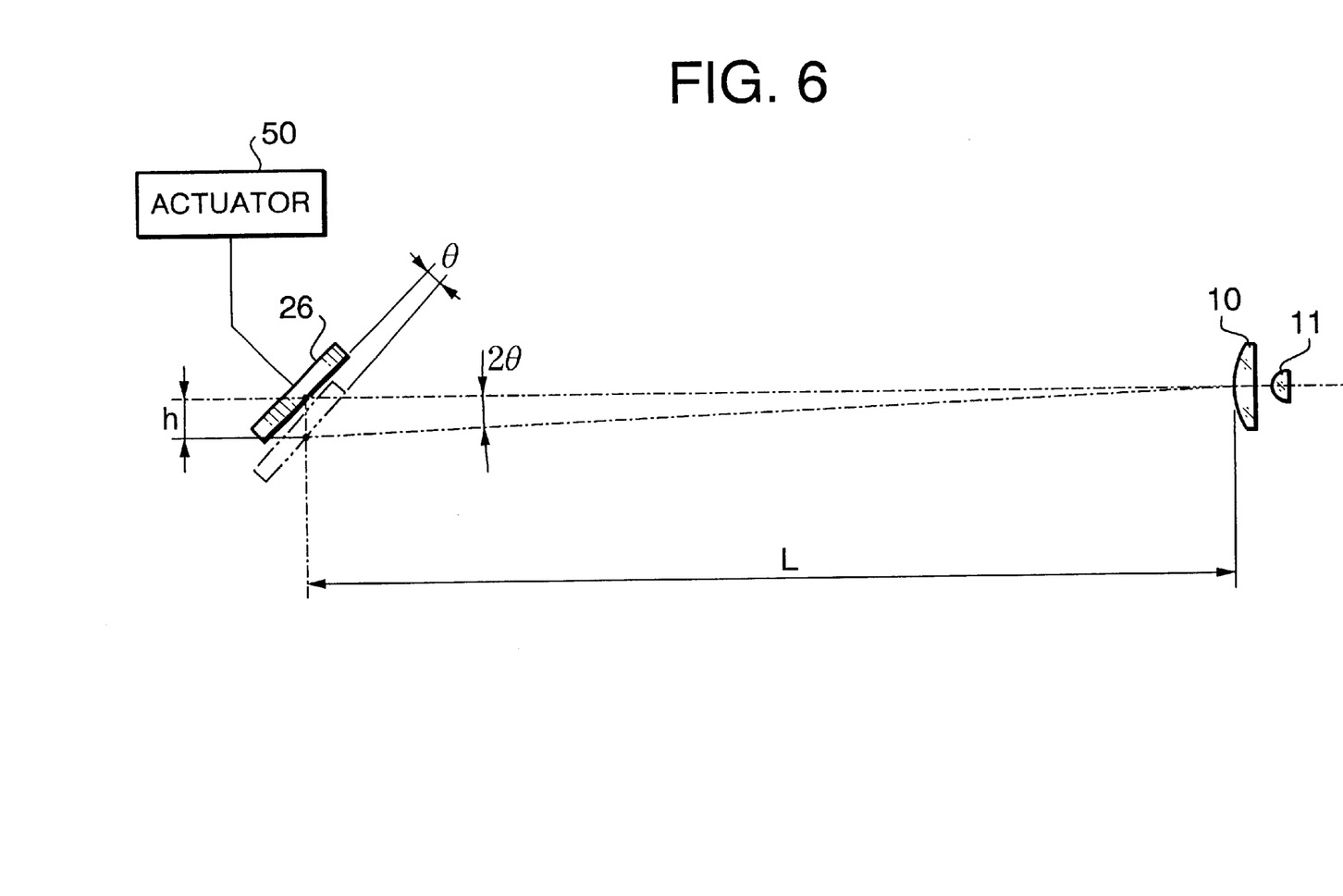
FIG. 6 illustrates movement of a galvano mirror according to the first embodiment of the invention.

In order to solve this problem, as shown in FIG. 6, an actuator 50 for moving the galvano mirror 26 in a direction along which the beam is incident from the composite prism assembly 21 to the galvano mirror 26 is provided.

FIG. 6 illustrates the movement of the galvano mirror in the direction in which the incident beam proceeds. When the galvano mirror 26 is rotated in order to change the incident angle of the beam incident on the objective lens 10, the actuator 50 moves the galvano mirror 26, in accordance with rotation amount thereof, in the direction along which the laser beam emitted by the laser diode 18 and incident on the galvano mirror 26 proceeds. An amount of movement h is calculated in accordance with equation (1) below:

$$h = L \tan(2\theta) \quad (1)$$

where, L represents a distance between the galvano mirror 26 and the objective lens 10; and θ is a rotational angle of the galvano mirror 26 with respect to its initial position. It should be noted that, the distance L can be considered to be constant, and the angle θ can be determined in accordance with the output of the tracking detection sensor 25.

With the above-described construction, the light beam reflected by the galvano mirror 26 is always incident at substantially the same position but at different incident angles, on the objective lens 10.

The laser beam 13 that has returned from the surface of the optical disc 2 travels through the floating head 6 and the galvano mirror 26. Then, the laser beam 13 enters the composite prism assembly 21 and is reflected by the first half mirror surface 21b to the second half mirror surface 21c. The laser beam passed through the second half mirror surface 21c is directed to the tracking detection sensor 25. The tracking detection sensor 25 outputs a track error signal based on the incident laser beam. The laser beam that has reflected by the second half mirror surface 21c is split by a Wollaston prism 32 (shown in FIG. 4), generating two polarized beams. The polarized beams are converged (by a converging lens 33) on the data detection sensor 24 via the reflection prism 23. The data detection sensor 24 has two light receiving portions which respectively receives two polarized beams. With this, the data detection sensor 24 reads data recorded on the optical disc 2. In particular, the data signal from the tracking detection sensor 25 and data detection sensor 24 are generated by a not-shown amplifier circuit and sent to a not-shown control circuit.

As described above, according to a first embodiment of the invention, it is ensured that the laser beam deflected by the galvano mirror is incident substantially at the same position on the objective lens. Only the incident angle is changed as the galvano mirror 26 is rotated. Thus, according to the optical system described above, lowering of the coupling efficiency between the objective optical system and the light source is prevented.

Next, an optical disc drive employing an optical system according to a second embodiment will be described.

Figure 7:
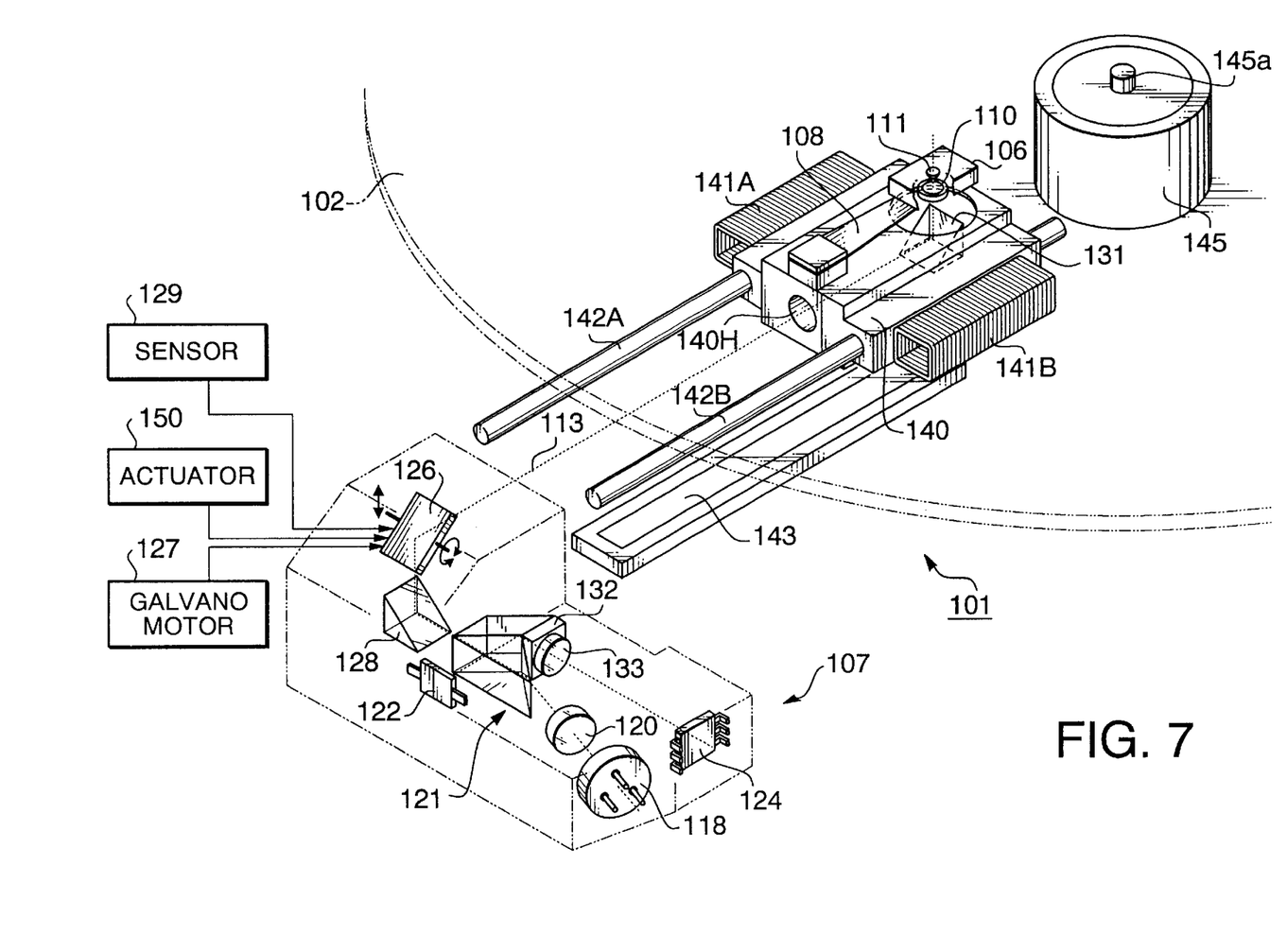
FIG. 7 is a perspective view of an optical disc drive according to a second embodiment of the present invention.

FIG. 7 is a perspective view of a disc drive 101 according to a second embodiment of the invention. The disc drive 101 is, similarly to the disc drive 1, capable of writing/reading data on/from an optical disc 102 by means of the NFR technology.

In the disc drive 101, the optical disc 102 is mounted to a rotating shaft 145a of a spindle motor 145. The disc drive 101 includes a carriage 140 which is movable on a plane parallel to a surface of the optical disc 102 and in a radial direction thereof. The carriage 140 is slidably supported by a pair of guide rails 142A and 142B extending in a radial direction of the optical disc 102. The carriage 140 is driven to move, with being guided by the guide rails 142A and 142B, by a linear motor composed of a pair of coils 141A, 141B and permanent magnets 144A, 144B.

A floating head 106 that carries optical elements is provided to a tip portion of the carriage 140. When the carriage 140 is driven to move, the floating head 106 moves in the radial direction of the optical disc 102, across tracks formed on the optical disc 102. On a base frame (not shown) of the disc drive 101, a light source module 107 is provided. The light source module 107 emits a parallel laser beam in a direction parallel to the movable direction of the carriage 140. On a side surface of the carriage 140, facing the light source module 107, an opening 140H is formed for receiving the light beam emitted from the light source module 107. The light beam, emitted by the light source module 107, passes through the opening 140H and, via a reflection mirror 131 provided at an end portion of the carriage 140, is incident on an objective lens 110.

Figure 8:
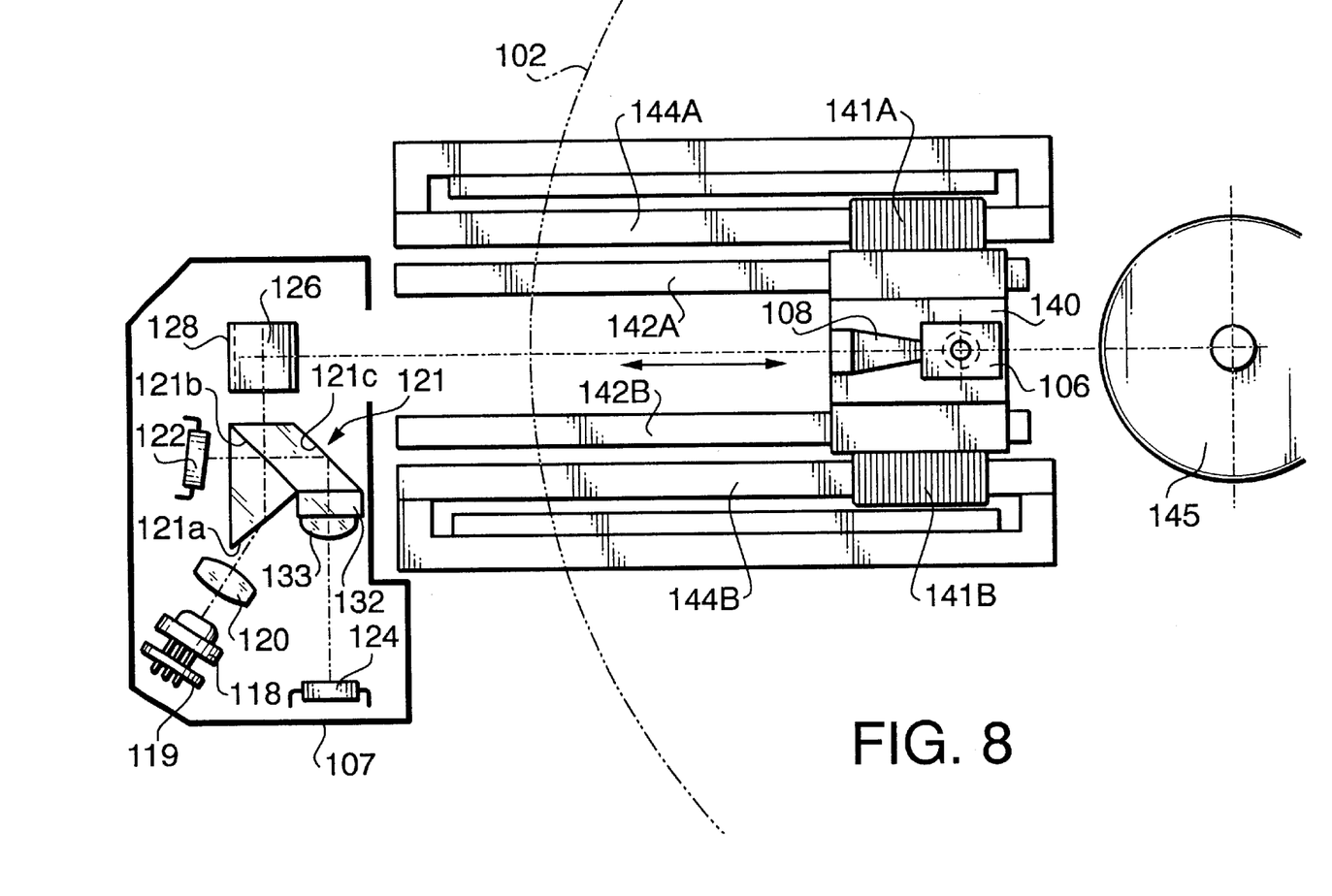
FIG. 8 is a plan view of the main portion of the disc drive shown in FIG. 7.
Figure 9:
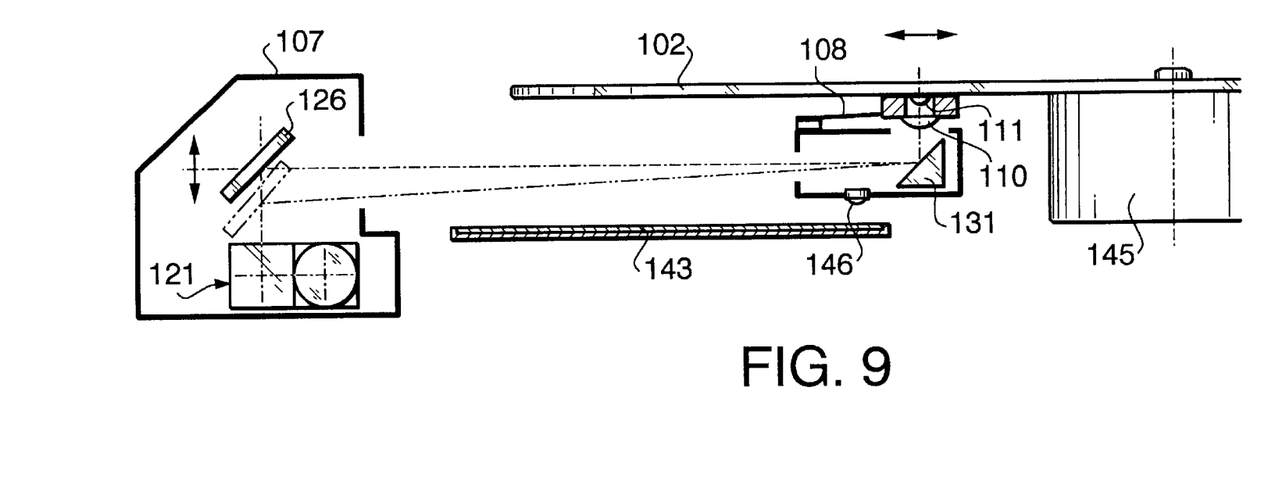
FIG. 9 is a side view of the optical system of the disc drive shown in FIG. 7.

FIG. 8 is a plan view of the optical head 101 and FIG. 9 is a side view of the optical head 101. As shown in FIGS. 7 through 9, the floating head 106 is mounted on the carriage 140 via a flexure beam 108. One end of the flexure beam 108 is fixed to the upper surface of the carriage 140, while the floating head 106 is fixed to the other end of the flexure beam 108. Thus, the flexure beam 108 elastically urges the floating head 106 toward to optical disc 102. When the optical disc 102 rotates, the floating head 106 is apart from the optical disc 102 by air flow generated between the spinning optical disc 102 and the floating head 106.

Figure 10:
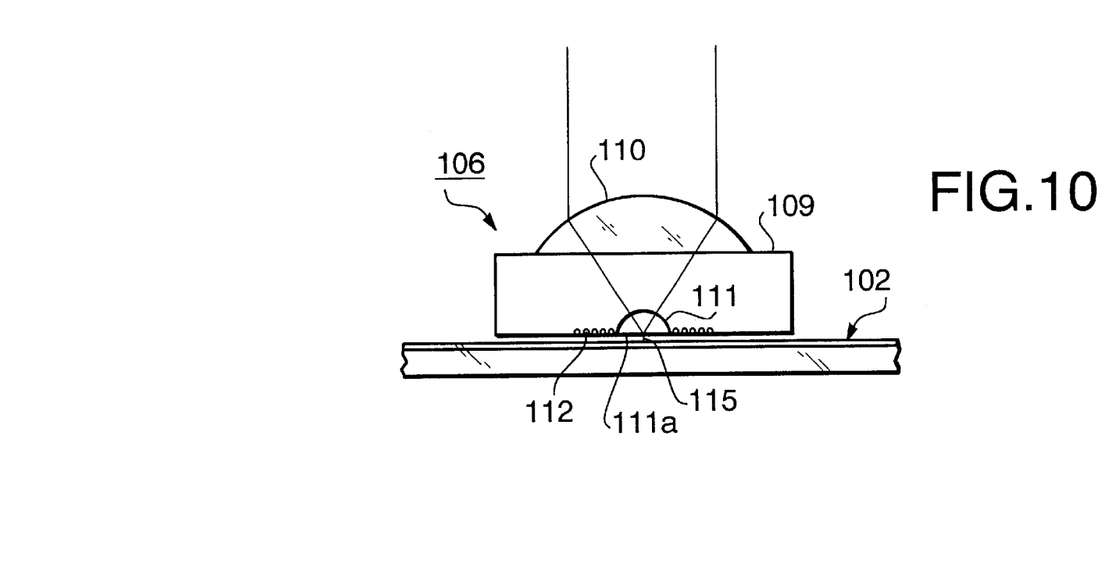
FIG. 10 is an enlarged view of a floating head of the optical disc drive of FIG. 7.

As shown in FIG. 10, the floating head 106 includes an objective lens 110 and a solid immersion lens (SIL) 111. As shown in FIG. 9, the reflection mirror 131 mounted on the bottom of the carriage 140 reflects the laser beam emitted from the light source module 107 to the objective lens 110. The objective lens 110 converges the laser beam on the optical disc 102. The solid immersion lens 111 is a hemispherical lens and is arrange such that the plane surface thereof faces the optical disc 102. Further, the focal point of the objective lens 110 is positioned on the plane surface of the solid immersion lens 111. That is, the laser beam is converged on the plane surface 111a of the solid immersion lens 111. Since the clearance of the optical disc 102 and the plane surface 111a of the solid immersion lens 111 is less than 1 μm, the converged laser beam is converted to the evanescent beam and reaches the optical disc 102. Similar to the first embodiment, the beam diameter of the evanescent beam is smaller than the converged laser beam, and therefore a data storage capacity can be remarkably increased.

In order to apply magnetic field on the surface of the optical disc 102, a coil 112 is provided around the solid immersion lens 111. A current flow in the coil 112 generates a magnetic field in which the optical disc 102 is positioned. Data writing is performed by the evanescent beam from the solid immersion lens 111 and the magnetic field generated by the coil 112.

As described above, and as shown in FIGS. 7 through 9, the carriage 140 carries the floating head 106. On either side of the carriage 140, linear motor coils 141A, 141B are provided. As shown in FIG. 8, through the linear motor coils 141A, 141B, a pair of linear motor magnets 144A, 144B extend in a direction parallel to the moving direction of the carriage 140. When electrical current flows across the linear motor coils 141A and 141B, the carriage 140 slides along the guide rails 142A, 142B, due to the electromagnetic induction.

On the bottom surface of the carriage 140, an LED 146 is provided, and over the movable range of the carriage, a linear position sensor 143 is provided, which extends in the moving direction of the carriage 140 and faces the LED 146. The linear position sensor 143 detects the position of the carriage 140 in accordance with a position on which the light beam emitted by the LED 146 is incident.

As shown in FIGS. 7 through 9, the light source module 107, which is mounted on the base frame of the disc drive, includes a semiconductor laser 118, a laser drive circuit 119, a collimator lens 120 and a composite prism assembly 121. Further, the light source module 107 includes a laser power monitor sensor 122, a reflection prism 128, a Wollaston prism 132, a converging lens 133, a beam sensor 124 and a galvano mirror 126.

A divergent laser beam emitted from the laser diode 118 is converted to a parallel laser beam by the collimator lens 120. Due to the characteristics of the laser diode 118, the laser beam emitted by the laser diode 118 has an elliptical cross section. In order to correct the sectional shape of the laser beam, an incident surface 121a of the composite prism assembly 121 is inclined with respect to the incident laser beam. When the laser beam is refracted by the incident surface 121a of the composite prism assembly 121, the sectional shape of the laser beam becomes a circle. The laser beam then enters a first half mirror surface 121b. By the first half mirror surface 121b, the laser beam is partially directed to the laser power monitor sensor 122. The laser power monitor sensor 122 detects the intensity of the incident laser beam. The output from the laser power monitor sensor 122 is sent to a power control circuit (not shown) so as to adjust the power of the semiconductor laser 118.

The laser beam reflected by the galvano mirror 126 proceeds to the reflection mirror 131 and is reflected (by the reflection mirror 131) to the floating head 106. Then, the laser beam is converged and incident on the optical disc 102. By rotating the galvano mirror 126, the incident angle of the laser beam 113 incident on the objective lens 110 is changed, so that the light spot on the optical disc 102 is moved. The rotating angle of the galvano mirror 126 is detected by a galvano mirror positioning sensor 129 located in the vicinity of the galvano mirror 126.

When the galvano mirror 126 rotates to change the incident angle of the laser beam 13 incident on the objective lens 110, there is a possibility that the laser beam 13 partially fails to enter the objective lens 10.

In order to solve this problem, as shown in FIG. 7, an actuator 150 for moving the galvano mirror 126 in a direction along which the beam is incident from the reflection prism 128 to the galvano mirror 126 is provided.

Similarly to the first embodiment, an amount of movement h' is calculated in accordance with equation (2) below:

$$h'=L' \tan(2\theta) \quad (2)$$

where, L' represents a distance between the galvano mirror 126 and the objective lens 110; and θ is a rotational angle of the galvano mirror 126 with respect to its initial position. It should be noted that, in the second embodiment, the distance L' varies depending on the position of the carriage 140, and can be obtained in accordance with detection result of the linear motor sensor 143.

With the above-described construction, the light beam reflected by the galvano mirror 126 is always incident at substantially the same position but at different incident angles, on the objective lens 110.

As described above, according to the second embodiment of the invention, it is ensured that the laser beam deflected by the galvano mirror is incident substantially at the same position on the objective lens. Only the incident angle is changed as the galvano mirror 26 is rotated. Thus, lowering of the coupling efficiency between the objective optical system and the light source is prevented.

Figure 11:
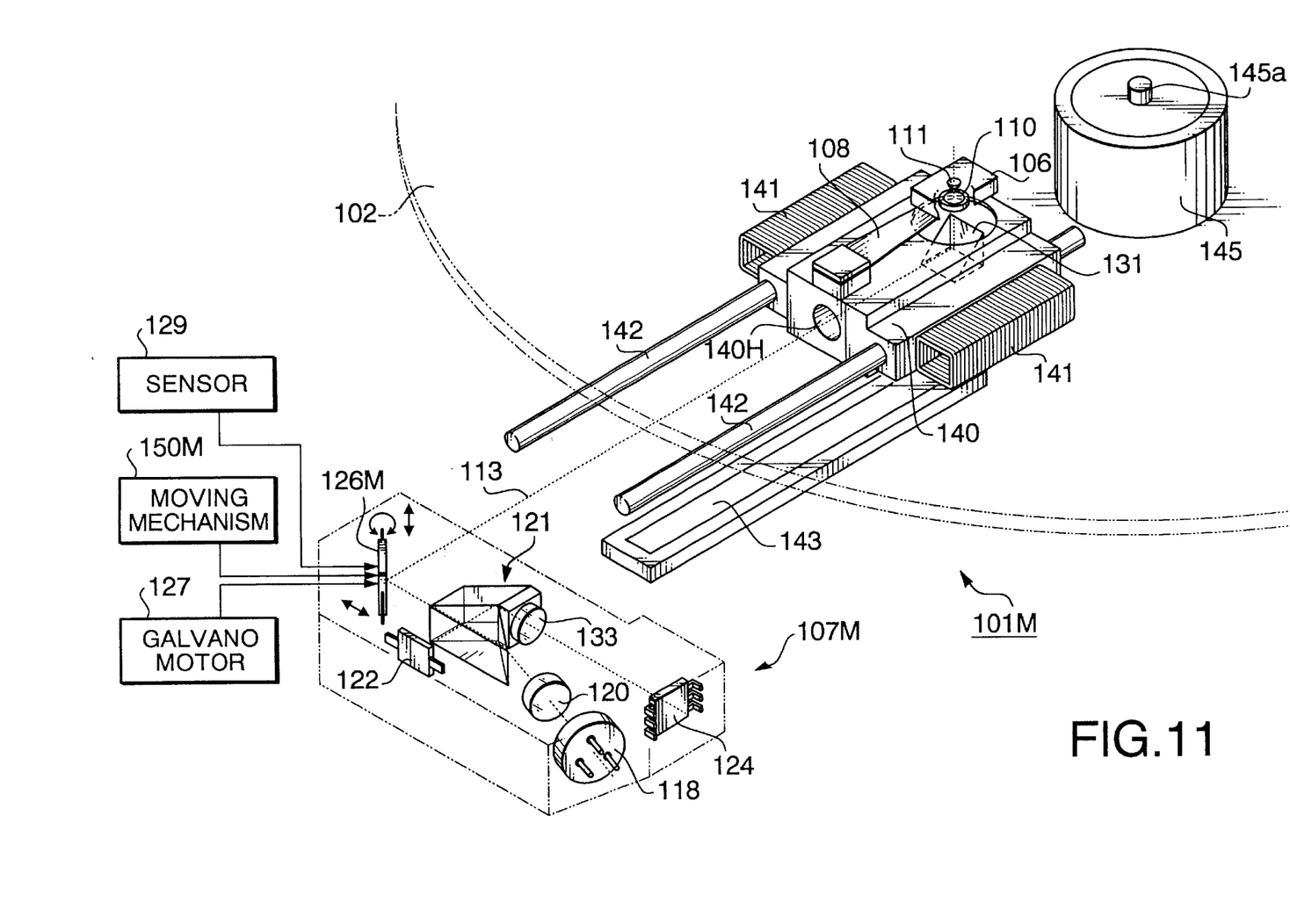
FIG. 11 shows a perspective view of a main portion of a disc drive according to a third embodiment of the invention.

FIG. 11 shows an optical system for a disc drive 101M according to a third embodiment of the invention.

In the third embodiment, a structure of a light source module 107M is different from the light source module 107 shown in FIG. 7. Specifically, in the light source module 107M, the reflection prism 128 is not used, and the light beam emitted from the composite prism assembly 121 is directly made incident on the galvano mirror 126M. In the third embodiment, the rotational axis of the galvano mirror 126M extends in parallel with the surface of the optical disc 102 and forms a predetermined angle (45 degrees in this different form) with respect to the light beam which is directed to the reflection mirror 131 from the galvano mirror 126M.

In the third embodiment, in addition to the galvano motor 127 for rotating the galvano mirror 126M, there is provided a moving mechanism 150M for moving the galvano mirror 126M in a direction along which the laser beam is incident thereon from the composite prism assembly 121. The moving mechanism 150M moves the galvano mirror 126M in accordance with the rotational angle of the galvano mirror 126 such that the relationship of the formula (2) above is satisfied.

The present disclosure relates to the subject matters contained in Japanese Patent Applications Nos. HEI 09-316083 and HEI 09-316084, filed on Oct. 31, 1997, which are expressly incorporated herein by reference in their entireties.

What is claimed is:

1. An optical system for an optical disc drive, comprising:
a laser source that emits a laser beam;
an objective optical system that receives said laser beam and converges the laser beam on an optical disc;
a deflection mirror provided between said laser source and said objective optical system, said deflection mirror being rotatable about a rotation axis, the laser beam emitted by said laser source being reflected by said deflection mirror and directed toward said objective optical system, the laser beam proceeding from said deflection mirror toward said objective optical system proceeding in a direction parallel to an optical axis of said objective optical system when said deflection mirror is located at a neutral position;
a first driver which rotates said deflection mirror;
a rotation amount detecting system that detects a rotation angle of said deflection mirror with respect to said neutral position; and
a second driver which moves said deflection mirror in a direction along which the laser beam is incident, from said laser source, onto said deflection mirror, said second driver moving said deflection mirror so that the laser beam deflected by said deflection mirror is incident on said objective optical system substantially at the same position regardless of rotation amount of said deflection mirror, wherein said second driver moves said deflection mirror in accordance with the rotation angle of said deflection mirror, and wherein an amount (h) of movement of said deflection mirror is determined based on an equation:

$$h=L \tan(2\theta),$$

where L represents a distance between said deflection mirror and said objective optical system, and θ represents the rotation angle of said deflection mirror.

2. The optical system according to claim 1, wherein said objective optical system is movable in a transverse direction of tracks formed on said optical disc, and wherein the distance between said laser source and said objective optical system is changeable.

3. The optical system according to claim 1, wherein said objective optical system is movable in a transverse direction of tracks formed on said optical disc, and wherein the distance between said laser source and said objective optical system is constant.

4. The optical system according to claim 1, wherein the rotation axis of said deflection mirror extends perpendicular to a surface of said optical disc, and wherein said second driver moves said deflection mirror in a direction parallel to the surface of said optical disc.

5. The optical system according to claim 1, wherein the rotation axis of said deflection mirror extends in parallel with a surface of said optical disc, and wherein said second driver moves said deflection mirror in a direction perpendicular to the surface of said optical disc.

6. The optical system according to claim 1, wherein the rotation axis of said deflection mirror extends in parallel with a surface of said optical disc, and wherein said second driver moves said deflection mirror in a direction parallel to the surface of said optical disc.

7. A method of deflecting, by means of a deflection mirror, a light beam emitted by a light source towards an objective optical system of an optical head for an optical disc drive, comprising:

rotating the deflection mirror; and moving the deflection mirror in a direction along which the light beam emitted by the light source is incident on the deflection mirror such that the laser beam deflected by said deflection mirror is incident on the objective optical system substantially at the same position regardless of rotation amount of the deflection mirror, wherein an amount (h) of movement of the deflection mirror is determined based on an equation:

$$h = L \tan(2\theta),$$

where L represents a distance between the deflection mirror and the objective optical system, and $\theta$ represents the rotation angle of the deflection mirror.

8. The method according to claim 7, wherein the objective optical system is movable in a transverse direction of tracks formed on said optical disc, and wherein the distance between the light source and the objective optical system is changeable.

9. The method according to claim 7, wherein the objective optical system is movable in a transverse direction of tracks formed on the optical disc, and wherein the distance between the light source and the objective optical system is constant.

* * * * *